United States Patent [19]
Friedman et al.

[11] 3,914,648
[45] Oct. 21, 1975

[54] FLASHLAMP DISCHARGE CIRCUIT

[75] Inventors: Herbert W. Friedman, Peabody;
Robert F. Caristi, Stoneham;
Richard G. Morton, Revere, all of Mass.

[73] Assignee: Avco Everett Research Laboratory, Inc., Everett, Mass.

[22] Filed: May 10, 1974

[21] Appl. No.: 468,826

[52] U.S. Cl. ............ 315/241 P; 315/171; 315/173; 331/94.5 P; 331/94.5 PE
[51] Int. Cl.² ........................................ H05B 37/00
[58] Field of Search ........... 315/119, 137, 171, 173, 315/176, 240, 241 P, 241 R; 331/94.5 PE, 94.5 P

[56] References Cited
UNITED STATES PATENTS
| | | | |
|---|---|---|---|
| 3,430,159 | 2/1969 | Roeber | 315/241 R X |
| 3,577,174 | 5/1971 | Longsderff | 315/240 X |

*Primary Examiner*—R. V. Rolinec
*Assistant Examiner*—Lawrence J. Dahl
*Attorney, Agent, or Firm*—Charles M. Hogan, Esq.; Melvin E. Frederick, Esq.

[57] ABSTRACT

The disclosed flashlamp discharge circuit comprises one or more gas discharge flashlamps, a pulsed preionization circuit for providing across each flashlamp a short, high voltage, low energy preionizing pulse, and a main discharge circuit actuated by the preionization circuit for providing the main flashlamp discharge at about the end of the application of the preionization pulse. The main discharge circuit is arranged in part to have minimum inductance by providing a return current flow equal, opposite and in close proximity to the forward current flow in the flashlamp. The preionizing pulse is provided through a transformer or transformers which also provides the necessary trigger pulse for the main discharge circuit. The main discharge circuit may be variable to provide from below or just sufficient energy to produce a population inversion to that energy necessary for producing the maximum possible population inversion.

8 Claims, 4 Drawing Figures

FLASHLAMP DISCHARGE CIRCUIT

This invention relates to apparatus for providing high power, repetitive operation of a gas discharge tube, and more particularly, to an improved discharge circuit which is particularly suitable for use with pulsed high power lasers and arc lamps having short pulse duration.

Xenon flashlamps are well-known in the prior art. These devices range from the repetitive commercial photographic flashers to high power, very high repetitive rate specialty devices used for laser pumping.

Flashlamps of the type used for laser pumping conventionally take the form of a long, narrow, quartz tube containing an inert gas (e.g., Xenon) at low pressure, with electrodes sealed into the opposite ends. One or more of such flashlamps may be optically coupled to a lasing medium.

Such flashlamps are normally powered by one or more energy storage capacitors charged by an appropriate power supply and shunting the electrodes of the flashlamp. The breakdown voltage of the flashlamp is generally lower than the power supply voltage so that a series switch is inserted between the power supply and the flashlamps. One conventional approach to facilitate initial ionization of the gas, or "triggering" of the flash tube, involves the use of a helical conductor wrapped around the flash tube such that the conductor encircles the outside of the flash tube envelope and is capacitively coupled to the gas inside. The application to the conductor of a relatively large amplitude voltage pulse causes the gas to be ionized sufficiently to effect discharge of the storage capacitor through the flash tube, producing a short burst of intense light containing sufficient energy in the pumping frequency of the lasing medium to cause a population inversion to occur.

Another approach involves the provision of a pulse operative main power supply network connected to the flash tube by a fast-acting, repetitively operable switching means, and a DC keep-alive circuit connected in parallel with the flash tube for sustaining a low level discharge in the flash tube when the main power supply network is decoupled from the flash tube. The keep-alive network provides a continuous level of ionization in the flash tube which facilitates the formation of the pulse discharge at reasonable starting voltages at the beginning of the pulses. For a more comprehensive discussion of this type of approach, reference is made to U.S. Pat. No. 3,551,738, issued Dec. 29, 1970 to Robert G. Young.

Another approach involves the use of a three-phase AC power supply in combination with control circuitry, the actuation of which is synchronized with and caused by the three-phase supply. The control circuit functions to supply current from the different phases at the right time and actuate a trigger circuit, again in synchronism with the three-phase supply, operative to supply a high voltage ionizing pulse to the flashlamp. For a more comprehensive discussion of this type of approach, reference is made to U.S. Pat. No. 3,416,031 issued Dec. 10, 1968 to H. E. Franks et al.

Laser applications requiring short flashlamp pulses of high peak power visible and near ultraviolet radiation include the optical pumping of solution of organic dye lasing mediums. In many such discharges, the flashlamp impedance is low, of the order of an ohm, and voltage levels of the order of 10 KV to 24 KV are necessary to generate the high power necessary to efficiently pump dyes. In these cases, such voltages are often in excess of the static hold-off capability of most flashlamps and thus a switch such as, for example, a thyratron, spark gap, ignitron or the like is placed in series.

In the simplest form of this circuit, no preionizing pulse is applied to the flashlamp and breakdown occurs when the switch is closed and the flashlamp is suddenly overvoltaged. In applications where the required pulse duration is short, the overvoltage method tends to become unreliable at all but the highest voltage levels. Further, this effect becomes more pronounced as the flashlamp ages and in these cases, the lamp threshhold voltage (the minimum voltage at which flashlamp fires) generally exceeds the lasing threshhold voltage.

The physical reasons for the above-noted gradual increase in the flashlamp threshold voltage are not perfectly understood; however, it has been found that there is a finite time delay between the application of a voltage to the flashlamp and the onset of conduction or firing of the flashlamp. It is believed that this time lag may be associated with the propagation of streamers with a velocity of the order of 10 cm/sec. resulting, for example, in delays of a few microseconds for a flashlamp having a 30 cm arc length. There is also reason to believe that the velocity of propagation of these streamers decreases with age, due possibly to the build-up of contaminants on the walls or in the gas of the flashlamps.

For pulse durations comparable to the streamer propagation time, a significant fraction of the pulse energy may be wasted during initiation of gas breakdown thus resulting in a poor conversion efficiency of electrical energy to optical radiation. Accordingly, it is a principal object of the present invention to provide electrical power supply means to operate gas discharge flashlamps or the like operable over a wide range of voltages.

It is another object of the invention to provide a high power gas discharge wherein the gas discharge device has a greatly extended operating lifetime with a high maintenance of light output during a lifetime.

It is another object of the invention to dependably and more efficiently provide rapid discharge of flashlamps at high pwer levels.

A further object of the invention is to provide a flashlamp discharge circuit wherein the initial inductance and the risetime of the flashlamp discharge current is reduced to provide maximum peak power of the flashlamp radiation.

It is still further object of the invention to provide a flashlamp discharge circuit that is dependable in operation and that simply, economically and dependably permits flashlamps to be operated at selected levels of operation from a minimum to a maximum level, thereby facilitating the operation, calibration, and/or testing of laser incorporating the invention.

The novel features that are considered characteristic of the invention are set forth in the appended claims; the invention itself, however, both as to its organization and method of operation, together with additional objects and disadvantages thereof, will best be understood from the following description of a specific embodiment, when read in conjunction with the accompanying drawings, in which:

Figure 1:
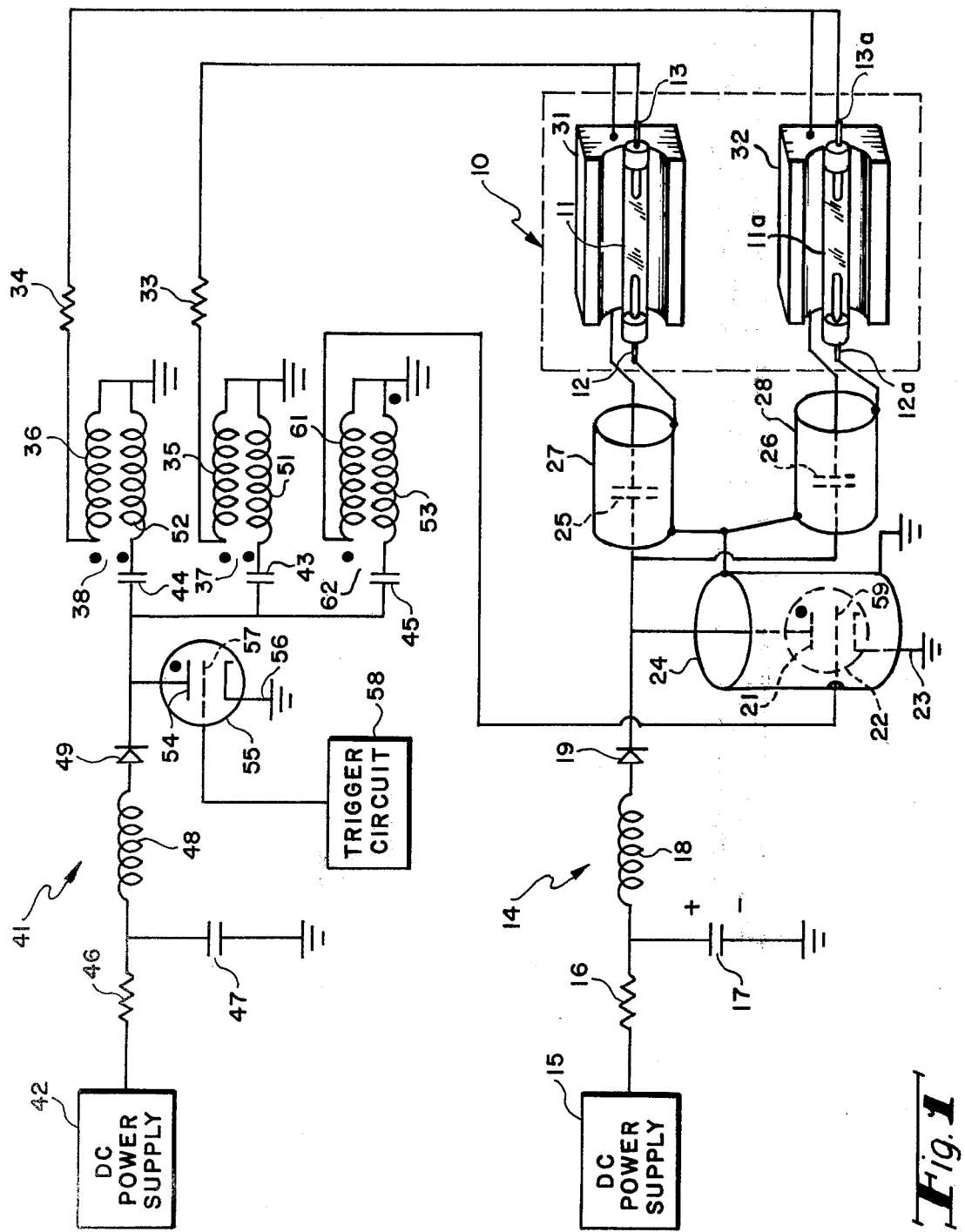
FIG. 1 is a partially pictorial and schematic circuit diagram showing one embodiment of a suitable arrangement for operating a pair of flashlamps according to the present invention.

Referring now to FIG. 1, the reference numeral 10 denotes the optical portion of a laser oscillator. The lasing medium and optical cavity has been omitted and two flashlamps are shown in side by side relationship for purposes of convenience and clarity. The use of gas discharge flashlamps 11 and 11a powered in accordance with the present invention to provide pumping energy for a lasing medium is offered only by way of example as a most useful method of practicing the invention.

As is well-known in the laser art, when the intensity of the optical radiation produced by one or more flashlamps for pumping a lasing medium exceeds a certain critical value, a population inversion occurs in the lasing medium and laser action occurs.

Flashlamps 11 and 11a are capable of producing light of sufficient intensity to pump a suitable lasing medium such as, for example, a laser rod or dye (not shown) above its lasing threshhold and usually takes the form of a tubular quartz envelope containing Xenon gas at a low pressure and having metallic electrode 12–13 and 12a–13a, sealed therein at opposite axial ends. In the usual case, the electrodes are shunted by a bank of capacitors connected in parallel and adjusted to supply a high voltage pulse to one or both of the lamps, thus producing the light output required from the flashlamp.

In accordance with the present invention, a main discharge circuit denoted by the numeral 14 is connected across electrodes 12–13 and 12a–13a of the flashlamps 11 and 11a. The main discharge circuit may include a power supply comprised of a variable main DC power supply 15 connected through a resistor 16 to a grounded large energy storage capacitor 17 for charging the capacitor 17 to a voltage $V_o$ of, for example, 10–15 KV. This voltage $V_o$ is inductively doubled by inductor 18 and held by diode 19. With this arrangement, a voltage of $2V_o$, such as, for example 20–30 KV, is applied to the anode 21 of a thyratron 22, the cathode 23 of which, in this case, is connected to ground. The tyhratron 22 is preferably housed in a grounded coaxial metal container 24 for providing low inductance in the main discharge circuit. Main discharge capacitors 25 and 26 also housed in coaxial metal containers 27 and 28 and electrically connected to container 24, are charged to $2V_o$ through respectively electrically conductive metal flashlamps reflectors 31 and 32, resistors 33 and 34 and grounded high voltage secondary windings 35 and 36 of pulse transformers 37 and 38. Transformers 37 and 38 form part of the ionizing circuit denoted by the numeral 41.

Electrodes 13 and 13a of respectively flashlamps 11 and 11a are connected to the ends of their reflectors remote from respectively capacitors 25 and 26 and the other electrodes 12 and 12a are connected to ground through the coaxial containers 27, 28 and 24.

Minimum inductance in the main discharge circuit is provided by reason of the connection and arrangement of the components comprising the main discharge circuit since they provide, in the main discharge circuit, return currents and current paths therefor equal, opposite and in close proximity to the forward currents and current paths.

It will be understood that for those applications requiring only a single flashlamp, those portions of the main discharge circuit and the ionizing circuit relating to the second flashlamp are not necessary, and, hence, may be omitted. On the other hand, if more than two flashlamps are desired or required, additional portions of the main discharge and ionizing circuits identical to those shown are added.

Directing attention now to the ionizing circuit 41, in a manner similar to that of the main discharge circuit, a DC power supply 42 charges discharge capacitors 43, 44 and 45 through a resistor 46, grounded capacitor 47, inductance 48, diode 49 and the primary windings 51, 52 and 53. Plate 54 of a second thyratron 55 is connected between diode 49 and discharge capacitor 44. The cathode 56 is connected to ground and the grid 57 is connected to a trigger circuit 58 for supplying trigger pulses to fire thyratron 55. Trigger circuit 58 may, for example, comprise a conventional variable rep rate generator. The grid 59 of thyratron 22 in the main discharge circuit 14 is coupled to the secondary winding 61 of the trigger pulse transformer 62.

Upon application to grid 57 of a trigger pulse from the trigger circuit 58, thyratron 55, which functions as a switch, turns on and discharges previously charged capacitors 43, 44 and 45 through the primary windings 51, 52 and 53. The high voltage secondary windings 35 and 36 step up the doubled primary voltage of, for example, 8 KV to the order of 30 KV and ionizes the flashlamps 11 and 11a. The low voltage secondary winding 61 of transformer 62 which may conveniently be a step-down transformer, provides a trigger pulse to grid 59 to trigger or switch to the on condition main thyratron 22. The anode delay time of the main thyratron 22 may be expected to vary typically between 0.1 and 0.5 $\mu$ sec. Depending on the particular tube, aging, etc., this is sufficient time for the filamentary arcs resulting from the high voltage low current from the secondary winding transformers 37 and 38 to diffuse at least in part throughout flashlamps 11 and 11a and thus create therein a generally spatially uniform level of ionization. The resistors 33 and 34 (which may be internal resistances) are selected to be small compared to the characteristic impedance of the main discharge circuit, but large compared to flashlamp impedance during discharge. Resistors 33 and 34 function to decouple the ionization circuit from the main discharge circuit and prevent damage to the pulse transformers 37 and 38.

Figure 4:
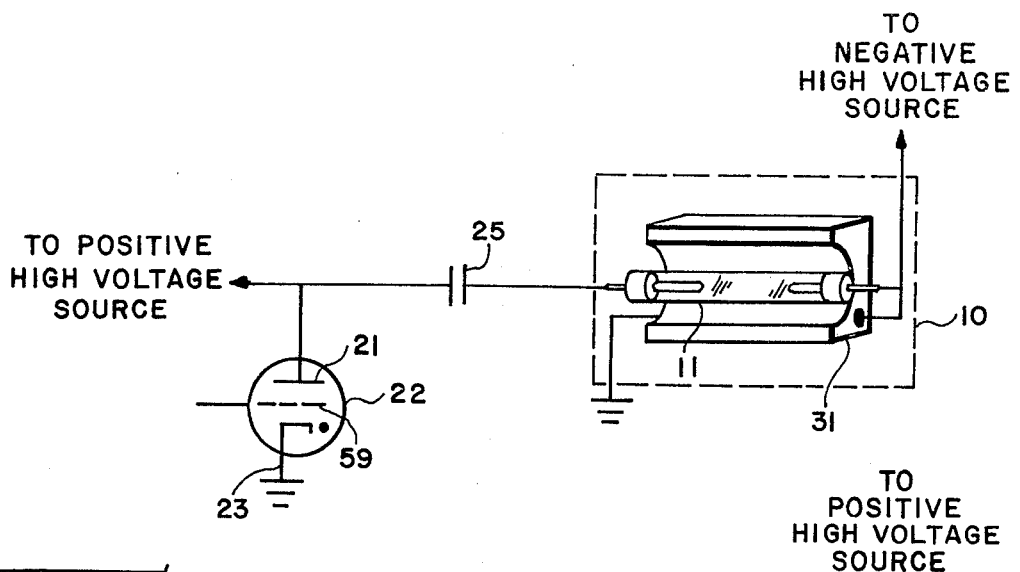
FIG. 4 illustrates a still further alternate arrangement for the main discharge circuit of FIG. 1.
Figure 3:
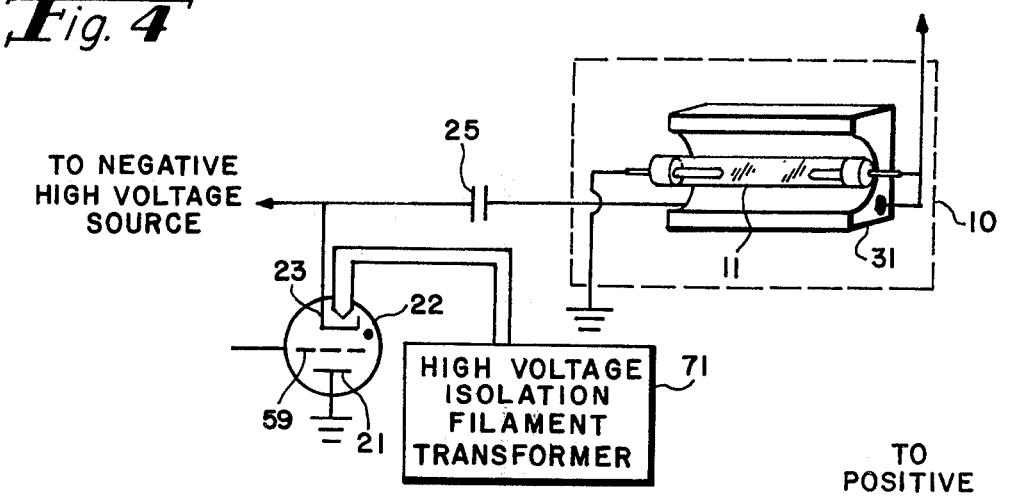
FIG. 3 illustrates a further alternate arrangement for the main discharge circuit of FIG. 1.
Figure 2:
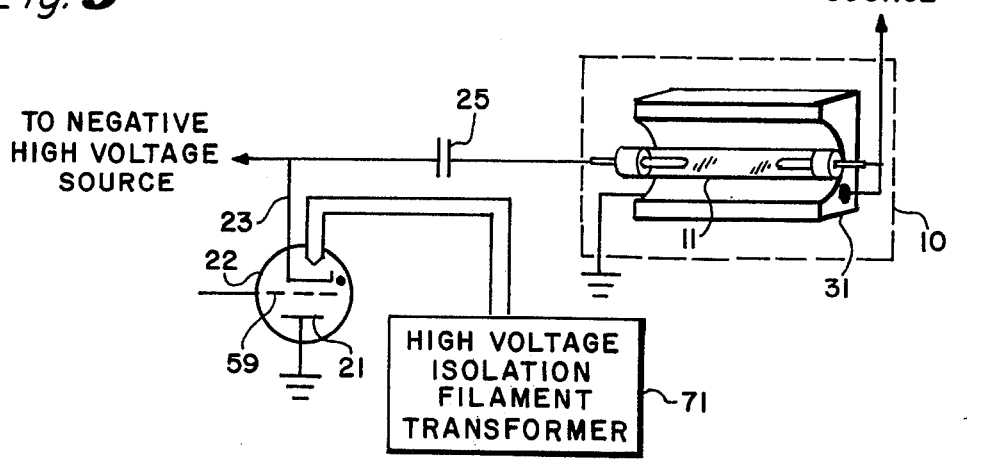
FIG. 2 illustrates an alternate arrangement for the main discharge circuit of FIG. 1.

FIGS. 2, 3, and 4 illustrate a number of variations within the scope of the invention. For purposes of clarity, the connections of the main discharge circuit for only one flashlamp is shown and the containers have been omitted. The containers are necessary only when circuit inductance is a problem as, for example, when it is desired to provide high energy flashlamp pulses at a high repetition rate for pumping a lasable liquid dye or the like.

In FIG. 2 is shown a slight variation of the main discharge circuit shown in FIG. 1 wherein the connections of the plate 21 and cathode 23 of the main discharge thyratron 22 are reversed, i.e., the plate 21 is grounded and the cathode 23 is connected to capacitor 25.

In the embodiment shown in FIG. 2, the reflector 31 is connected to ground, as shown, the main discharge capacitor 25 is charged by a negative high voltage source and the flashlamp 11 is pulsed by a rapid high voltage, low current positive pulse supplied by the ionizing circuit 41. In those cases where the thyratron plate is grounded as shown in FIG. 2 and FIG. 3, a high voltage isolation filament transformer 71 is provided.

The embodiment shown in FIG. 3 shows an arrangement identical to that shown in FIG. 2, except that the connections of the flashlamp and the reflector are reversed, i.e., the flashlamp 11 is connected to ground and the main discharge current is supplied to the flashlamp through the reflector 31. As noted previously, since the thyratron plate 21 is grounded, a high voltage isolation filament transformer 71 is provided as in FIG. 2.

Directing attention now to the embodiment shown in FIG. 4, as shown in this figure, the plate 21 of the main discharge circuit thyratron 22 is connected to capacitor 25, the cathode 23 is grounded and the main discharge current from the flashlamp is connected to ground through the reflector 31. In this case, however, the main discharge capacitor 25 is charged by a positive high voltage source and the flashlamp pulsed by a high voltage negative pulse supplied from the ionizing circuit 41.

As may now be seen in FIGS. 2 and 4, the reflector is grounded, whereas in FIGS. 1 and 3, the main discharge pulse is applied directly to the reflector and thence to the flashlamp.

Of the various embodiments discussed herein, it has been found that flashlamp breakdown or ionization is more reliable with the embodiments of FIGS. 1 and 2. The embodiment of FIG. 1 is preferred over that of FIG. 2 since performance of both embodiments is quite similar, and an isolation transformer is not required for the embodiment of FIG. 1.

In operation, the flashlamp of flashlamps as shown in FIG. 1 are ionized by supplying a trigger pulse as from trigger circuit 58 to thyratron 55 causing it to conduct and discharge capacitors 43, 44 and 45 through the primary windings of transformers 37, 38 and 62. The resulting short, high voltage low current pulses from the secondary winding of transformers 37 and 38 break down and flow through flashlamps 11 and 11a thereby reducing their impedances to a very low value. Simultaneously, transformer 62 provides a low voltage, high current trigger pulse to the grid 59 of thyratron 22. The circuit parameters of the ionizing and trigger circuits are selected whereby the trigger pulse to thyratron 22 is of sufficient amplitude to trigger thyratron 22 after the high voltage ionizing pulse disappears from its plate 21. Thus, while the flashlamps 11 and 11a are still ionized, thyratron 22 is triggered and applies the main discharge pulse to the flashlamps, thereby providing the desired level of radiation. Thyratron 22 is preferably caused to timely shut off by selecting circuit parameters, such as, for example, providing a loose coefficient of coupling in transformers 37 and 38 and proper choice of the flashlamp parameters to cause a slight reversal of polarity on the plate. Stated another way, the thyratron may be caused to ring a little bit in the negative direction.

Operation of flashlamps in accordance with the invention permits adjustment of the energy in the main discharge pulse to provide substantially any desired level of operation of the flashlamps. Since it is not necessary that the main discharge pulse be sufficient to break down the flashlamps, it may be reduced to the point where only enough energy is dumped into the flashlamps to just initiate lasing or it may be increased to the point where maximum lasing is achieved. Thus, even with old flashlamps having a threshhold voltage in excess of the lasing thresshold voltage, such flashlamps can be operated at the lasing threshhold to permit any lineup, alignment, operation or measurements at low or the lowest possible laser power levels. This is particularly advantageous since laser operation at or just above the lasing threshhold is the most desirable point for some measurements, for alignment and the like, and for lining up or setting the laser just prior to beginning high power measurements or operation.

Regarding the embodiment of FIG. 1, the provision of a positive pulse from the ionizing circuit has been found less attractive than the provision of a negative pulse. The reasons for this are that a positive ionizing pulse applied to the flashlamp tends to trigger the main thyratron either by overvoltaging it or exceeding its maximum rate of rise of plate voltage and, hence, tends to prematurely fire the thyratron. Accordingly, the preferred arrangement involves the use of a very short negative ionizing pulse. Such a fast negative pulse easily passes through the main discharge capacitor and appears on the plate of the main discharge thyratron, thereby lowering its voltage. The main discharge thyratron does not, therefore, fire with the application of the ionizing pulse. When the ionizing pulse breaks down or ionizes the flashlamp, the previous high voltage across the lamp drops to a low value and the voltage on the plate of the main discharge thyratron then rises quickly to the original charging voltage. This rate of rise of voltage on the plate of the thyratron may exceed the manufacturer's specification of $dv/dt$ and thus fire the thyratron without a separate grid pulse. However, for maximum reliability, a separate grid pulse from the ionizing transformer, in accordance with the invention, is preferred.

In the absence of the ionizing circuit, it is necessary to charge the main discharge capacitor to a voltage such as, for example, 20 KV or more to break down the flashlamp or lamps with which it is associated. However, with the provision of an ionizing circuit in accordance with the invention, the flashlamp or lamps will be ignited for all voltages above the threshhold of the thyratron. A flashlamp discharge circuit in accordance with the present invention permits operation of dye lasers near the lasing threshhold even with aged flashlamps.

The various features and advantages of the invention are throught to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

We claim:

1. Apparatus for operating a gas filled flashlamp discharge device having a pair of opposed electrodes comprising:
   a. main discharge circuit means including a high current flow path and first fast-acting electrically actuated switching means, said switching means having a delay time not greater than about a microsecond, said discharge circuit means being coupled to said electrodes for supplying to said electrodes through said high current flow path pulses of high current flow sufficient to operate said flashlamp device at a predetermined level of optical radiation, the said flow path for said high current flow including electrically conductive metallic means disposed immediately adjacent and extending substantially the length of said flashlamp device, a main discharge capacitor, and said first switching means, said flow path comprising a forward current flow path to one of said electrodes of said flashlamp device and a return flow path from the other of said electrodes, said return flow path being in close proximity, equal and opposite to said forward flow path to provide substantially minimum inductance in said flow path;

b. ionizing circuit means including second fast-acting electrically actuated switching means, said ionizing circuit means being coupled to said electrodes for supplying to said electrodes pulses of high voltage low current flow sufficient to at least substantially ionize said gas within about the delay time of said first switching means with a level of optical radiation substantially less than said predetermined level; and c. trigger circuit means actuated by said ionizing circuit means for supplying a trigger pulse to and triggering said first switching means and couple said pulses of high current flow to said said electrodes after said gas has been ionized whereby a pulse of said high current flow from said main discharge circuit is coupled to said electrodes only at about the end of each pulse of said high voltage low current flow from said ionizing circuit.

2. The combination as defined in claim 1 wherein said ionizing circuit means includes transformer means having a first high voltage secondary winding coupled to said flashlamp device and a second secondary winding forming part of said trigger circuit means coupled to said first switching means.

3. The combination as defined in claim 2 wherein said flow path further includes electrically conductive means surrounding said first switching means and said main discharge capacitor.

4. The combination as defined in claim 2 wherein said electrically conductive means is an optical reflector for conducting said high current flow and directing optical radiation produced by said flashlamp device.

5. The combination as defined in claim 4 wherein said low current flow supplied to said flashlamp device by said ionizing circuit means is negative with respect to said high current flow.

6. Apparatus for operating a gas filled flashlamp discharge device having a pair of opposed electrodes comprising:

a. main discharge circuit means including first thyratron switching means having a delay time of not greater than about a microsecond for repetitively supplying to said electrodes pulses of high current flow sufficient to operate said flashlamp device at a predetermined level of optical radiation, said main discharge circuit means further including electrically conductive optical reflector means disposed adjacent and extending substantially the length of said flashlamp device for conducting said high current flow and directing optical radiation produced by said flashlamp device; a main discharge capacitor connected to said first switching means, one end of said reflector means being connected to one of said flashlamp device electrodes; and electrically conductive means surrounding said first switching means and said capacitor, said conductive means being electrically interconnected and connected to ground, said reflector means, capacitor, first switching means, and electrically conductive means defining a current flow path comprising a forward current flow path to one of said electrodes of said flashlamp device and a return flow path from the other of said electrodes, said return flow path being in close proximity, equal and opposite to said forward flow path to provide substantially minimum inductance in said flow path;

b. ionizing circuit means including second switching means coupled to said electrodes for repetitively supplying to said electrodes pulses of high voltage low current flow sufficient to at least substantially ionize said gas within about the delay time of said first switching means with a level of optical radiation substantially less than said predetermined level, said ionizing circuit means further including transformer means having a high voltage secondary winding coupled to said flashlamp device; and c. trigger circuit means actuated by said ionizing circuit means for supplying a trigger pulse to and triggering said first switching means and thereby coupling said high current flow to said electrodes after said gas has been ionized, said trigger circuit means further including a low voltage secondary winding forming part of said transformer means whereby a pulse of said high current flow from said main discharge circuit is coupled to said electrodes only at about the end of each pulse of said high voltage low current flow from said ionizing circuit and within about a microsecond after a pulse of said high voltage low current flow from said ionizing circuit means is coupled to said electrodes.

7. The combination as defined in claim 6 wherein said main discharge capacitor is connected between said first switching means and the other end of said reflector means, and the other of said flashlamp device electrodes is connected to said electrically conductive means remote from said ground connection whereby said high flow flows from said other electrode through said electrically conductive means to ground.

8. The combination as defined in claim 6 wherein said main discharge capacitor is connected between said first switching means and the other of said flashlamp device electrodes, and the other end of said reflector means is connected to said electrically conductive means remote from said ground connection whereby said high current flow flows from said other end of said reflector means through said electrically conductive means to ground.

* * * * *

UNITED STATES PATENT OFFICE
CERTIFICATE OF CORRECTION

PATENT NO. : 3,914,648

DATED : October 21, 1975

INVENTOR(S) : Herbert W. Friedman, Robert F. Caristi and Richard G. Morton

It is certified that error appears in the above-identified patent and that said Letters Patent are hereby corrected as shown below:

Column 1, line 65, for "24 KV" read --25 KV--; Column 2, line 21, for "10 cm/sec." read --$10^7$ cm/sec.---; Column 2, line 43, for "pwer" read --power--; Column 3, line 47, for "tyhratron" read --thyratron--; Column 4, line 41, after "winding" insert --of--; Column 6, line 5, for "thresshold" read --threshhold--; and Column 8, line 51, after "high" insert --current--.

Signed and Sealed this thirteenth Day of April 1976

[SEAL]

Attest:

RUTH C. MASON  
Attesting Officer

C. MARSHALL DANN  
Commissioner of Patents and Trademarks